United States Patent [19]
Legg et al.

[11] Patent Number: 5,932,874
[45] Date of Patent: Aug. 3, 1999

[54] MEASUREMENT AND CONTROL SYSTEM FOR CONTROLLING SYSTEM FUNCTIONS AS A FUNCTION OF ROTATIONAL PARAMETERS OF A ROTATING DEVICE

[75] Inventors: Geoffrey A. Legg, North Billerica, Mass.; Gerard P. Riley, Chester, N.H.; Hans J. Weedon, Salem, Mass.

[73] Assignee: Analogic Corporation, Peabody, Mass.

[21] Appl. No.: 08/948,493

[22] Filed: Oct. 10, 1997

[51] Int. Cl.⁶ ..................................................... G01D 5/34
[52] U.S. Cl. ........................................... 250/231.13; 378/4
[58] Field of Search ...................... 250/231.13, 231.14, 250/231.16, 231.17, 231.18, 237 G; 356/375; 378/4, 9

[56] References Cited

U.S. PATENT DOCUMENTS 5,231,284  7/1993  Mizutani et al. .................. 250/231.13
5,432,339  7/1995  Gordon et al. ..................... 250/231.13

*Primary Examiner*—Edward P. Westin
*Assistant Examiner*—Kevin Pyo
*Attorney, Agent, or Firm*—Lappin & Kusmer LLP

[57] ABSTRACT

A measurement and control system for controlling system functions as a function of rotational parameters of a rotating device includes a plurality of interval markers distributed around the periphery of the rotating device and fixed relative to the device support. The measurement and control system also includes a plurality of sensors attached to the periphery of the rotating device, fixed relative to the rotating device so as to be in close proximity to the interval markers. Measurements from sensors attached to different locations on the rotating device are combined so as to mitigate variations in angular speed of the device. Measured rotational parameters are used to predict, via linear interpolation, angular positions of the device between those positions measured by the sensors.

14 Claims, 5 Drawing Sheets

COUNT FOR 1 REVOLUTION (i.e., 360 degrees) = 368,640

| ANGULAR POSITION OF DISK (W.R.T. HOME) | COUNT FROM PRIMARY SENSOR | COUNT FROM SECONDARY SENSOR | AVERAGE COUNT | COUNT AFTER 0.25 DEGREE OFFSET |
|---|---|---|---|---|
| 1 DEGREE | 1021 | 1025 | 1023 | 1279 |
| 2 DEGREE | 2047 | 2043 | 2045 | 2301 |
| 3 DEGREE | 3072 | 3070 | 3071 | 3327 |
| 4 DEGREE | 4100 | 4098 | 4099 | 4355 |
| 5 DEGREE | 5117 | 5117 | 5117 | 5373 |
| | • • • | | | |

MEASUREMENT AND CONTROL SYSTEM FOR CONTROLLING SYSTEM FUNCTIONS AS A FUNCTION OF ROTATIONAL PARAMETERS OF A ROTATING DEVICE

CROSS-REFERENCE TO RELATED APPLICATIONS

This application is related to U.S. Pat. No. 5,432,339 (Attorney Docket No. ANA-21 CON), entitled APPARATUS FOR AND METHOD OF MEASURING GEOMETRIC, POSITIONAL AND KINEMATIC PARAMETERS OF A ROTATING DEVICE HAVING A PLURALITY OF INTERVAL MARKERS, assigned to the present assignee, which is hereby incorporated by reference.

This application is related to the following U.S. applications filed on even date herewith, of common assignee, the contents of which are incorporated herein in their entirety by reference:

"Computed Tomography Scanner Drive System and Bearing," invented by Andrew P. Tybinkowski et al. (Attorney Docket No. ANA-128);

"Air Calibration Scan for Computed Tomography Scanner with Obstructing Objects," invented by David A. Schafer et al. (Attorney Docket No. ANA-129);

"Computed Tomography Scanning Apparatus and Method With Temperature Compensation for Dark Current Offsets," invented by Christopher C. Ruth et al. (Attorney Docket No. ANA-131);

"Computed Tomography Scanning Target Detection Using Non-Parallel Slices," invented by Christopher C. Ruth et al. (Attorney Docket No. ANA-132);

"Computed Tomography Scanning Target Detection Using Target Surface Normals," invented by Christopher C. Ruth et al. (Attorney Docket No. ANA-133);

"Parallel Processing Architecture for Computed Tomography Scanning System Using Non-Parallel Slices," invented by Christopher C. Ruth et al. (Attorney Docket No. ANA-134);

"Computed Tomography Scanning Apparatus and Method Using Parallel Projections from Non-Parallel Slices," invented by Christopher C. Ruth et al. (Attorney Docket No. ANA-135);

"Computed Tomography Scanning Apparatus and Method Using Adaptive Reconstruction Window," invented by Bernard M. Gordon et al. (Attorney Docket No. ANA-136);

"Area Detector Array for Computed Tomography Scanning System," invented by David A Schafer et al. (Attorney Docket No. ANA-137);

"Closed Loop Air Conditioning System for a Computed Tomography Scanner," invented by Eric Bailey et al. (Attorney Docket No. ANA-138);

"Rotary Energy Shield for Computed Tomography Scanner," invented by Andrew P. Tybinkowski et al. (Attorney Docket No. ANA-144).

STATEMENT REGARDING FEDERALLY SPONSORED RESEARCH

Not Applicable

REFERENCE TO MICROFICHE APPENDIX

Not Applicable

FIELD OF THE INVENTION

The present invention relates to a measurement and control system, and more particularly, to a system for and method of measuring various geometric, positional and kinematic parameters of a rotating device and utilizing those parameters to control various functions of the device.

BACKGROUND OF THE INVENTION

The present invention is intended to measure various geometric, positional and kinematic parameters with respect to and during the rotation of a rotatable device, such as a disk or drum, about a rotation axis where it is desired to utilize such parameters to control various functions of the device. The present invention is particularly applicable to computerized tomography (CT) scan systems and will therefore be described particularly in that context, but should not be considered to be limited to such systems. CT scan systems typically include a gantry comprising a disk or drum rotatable within a frame. In third generation CT scanners an X-ray source and X-ray detector array are mounted on the disk for rotational motion therewith about a table on which a patient can repose. The X-ray source and X-ray detector array are positioned about a point on the disk that defines the locus, hereinafter referred to as the "geometric center", about which the source and detector array prescribe correct rotational movement when the disk is rotated about the point during a scan so that the tomographic image can be accurately reconstructed. This geometric center ideally coincides with the nominal center of mass of the disk as well as the rotational center of the disk. In fourth generation CT scanners the X-ray source is mounted on a rotatable disk relative to the geometric center, while the detectors are disposed on the stationary frame equiangularly about the rotation axis of the disk. In both types of systems, the X-ray source may provide periodic pulses or continuous wave radiation. Each detector typically is either a solid state or a gas tube device.

In third generation type machines the detector array is disposed diametrically opposite the source across the disk, and is aligned with the focal spot of the source so that the detector array and focal spot are positioned within a common mean, scanning or rotation plane (normal to the axis of rotation of the disk). In the case of a detector array, each detector of the array is positioned in the scanning plane, typically at a predetermined angular spacing relative to the source so that each detector subtends an equal angle relative to the focal spot, thus providing a plurality of different X-ray paths in the scanning plane between the source and the respective detectors. In third generation machines, the X-ray paths can collectively resemble a fan with the apex of the fan at the focal spot of the X-ray source. In fourth generation machines the detectors are mounted on the gantry frame and the X-ray paths with respect to each detector resembles a fan with the apex at each detector input. Accordingly, both types of machines are sometimes referred to as "fan beam" tomography systems.

These systems provide a plurality of information or data signals corresponding to variations in the radiation flux measured by the detectors at each of a plurality of projection views, i.e., at precise angular positions of the disk during rotation of the disk about an object occupying the space between the detectors and the X-ray source. Upon known (Radon) mathematical processing of the signals commonly referred to as "back projection", a visual image can be formed representing a two-dimensional slice along the plane of rotation, i.e., the scanning plane, through the portion of the scanned object positioned in the plane between the source and the detectors. For helical scanned images, the object being scanned and the rotating disk are moved relative to one another in the direction of the rotation axis, while data is acquired. Other types of scanned images have also been proposed. See for example, U.S. patent application No. 08/831,558, entitled Nutating Slice CT Image Reconstruction Apparatus and Method, filed Apr. 9, 1997, in the names of Gregory L. Larson, Christopher C. Ruth, and Carl R. Crawford, and assigned to the present assignee, the application being incorporated herein by reference (Attorney's Docket No. ANA-118). The accurate formation of such images critically depends upon various factors including: (1) the movement of the disk being rotational precisely about the geometric center of the disk, (2) the geometric center remaining fixed in the scanning plane during a scan so that it does not move laterally within the plane relative to the scanned object as the disk rotates about its axis, (3) the X-ray exposure provided during each projection view being the same for each view, and (4) data being taken at precise angular positions of the disk so that data is correlated with the correct positional information of the X-ray source and/or the detectors relative to the scanned object when the image is back projected. The present invention is directed to improvements in the fourth factor, i.e., data being taken at precise angular positions, although those skilled in the art will recognize that parameters measured by the invention may also be used to improve the other three aforementioned factors.

A system for and method of measuring any one of several geometric, positional and kinematic parameters relating to a rotating device was described and claimed in U.S. Pat. No. 5,432,339, entitled APPARATUS FOR AND METHOD OF MEASURING GEOMETRIC, POSITIONAL AND KINEMATIC PARAMETERS OF A ROTATING DEVICE HAVING A PLURALITY OF INTERVAL MARKERS, which is hereby incorporated by reference, and is referred to as the "'339 Patent" herein. As described in the '339 Patent a measurement and control system can use the measurements to control the operation of various components on the rotating device.

A disadvantage inherent in the system described in the '339 Patent is that parametric data are collected by sensors which are stationary with respect to the rotating device. When components located on the rotating device must have access to the parametric data, the measurement and control system communicates the parametric data to the rotating device typically through communication means such as slip rings or broadcast (rf) transmission means. Such communications means increases the overall system cost, and can add noise and time delays to the parameter measurements.

It is therefore an object of this invention to provide a system which collects parametric data related to a rotating device while the system is resident on the rotating device, thereby eliminating the need to communicate such data to the rotating device.

Another object of this invention is to provide a system which generates a trigger signal as a function of parametric data related to a rotating device.

Yet another object of this invention is to provide a system which provides a modulation signal, possibly to a power supply so as to generate a power supply output voltage pattern as a function of parametric data related to a rotating device.

Other objects of the present invention will in part be evident and will in part appear hereinafter. The invention accordingly comprises the process involving the several steps and the relation and order of one or more of such steps with respect to the others and the apparatus possessing the construction, combination of elements, and arrangement of parts exemplified in the following detailed disclosure, and the scope of the application of which will be indicated in the claims.

SUMMARY OF THE INVENTION

The present invention is directed to a measurement and control system for controlling processes as a function of rotational parameters of a rotating device. Such processes include data collection at precise angular positions of the rotating device and synchronization of an X-ray tube power supply modulation waveform to precise angular positions of the rotating device.

Preferably, such a system comprises a plurality of interval markers fixed relative to an element which supports the rotating device, angularly spaced from one another along a circle of known radius around the rotating device, preferably concentric with the geometric center of the rotating device. A plurality of fixed sensors for detecting the markers are provided at predetermined angular positions on and at the periphery of the rotating device so that the sensors can detect the markers as the sensors pass the markers during rotation of the device. Means are provided for measuring one or more time intervals between detection of selected ones of said markers by one or more of the sensors.

In the preferred embodiment means are also provided for determining the angular position of the rotating device at any one instant of time as a function of the markers sensed and the measured time intervals between detection of selected ones of the markers. The preferred embodiment also includes means for measuring the angular velocity of the rotating device at any one instant of time also as a function of the markers sensed and the measured time intervals between detection of selected ones of the markers.

The invention employs at least three sensors, two of which are arranged as a diametrically opposed pair on the rotating device. The stationary markers are sensed by each sensor and the time interval between detection of successive markers is determined. Means are included for averaging measurements of the diametrically opposite sensors so as to mitigate any variations in the angular speed of the rotational device. The invention stores the averaged measurements and uses the stored values to correct subsequent measurements during operation of the system.

BRIEF DESCRIPTION OF THE DRAWINGS

The foregoing and other objects of this invention, the various features thereof, as well as the invention itself, may be more fully understood from the following description, when read together with the accompanying drawings in which:

FIG. 6 shows a table of exemplary values produced by the calibration procedure.

DETAILED DESCRIPTION OF THE INVENTION

The present invention is directed to a measurement and control system for controlling processes as a function of rotational parameters of a rotating device. The present invention can be more advantageously described in connection with its application to the rotatable disk of an X-ray tomographic apparatus, and is particularly useful in controlling the power applied to the X-ray source of a tomographic system. One such application includes the use of the measurement and control system for modulating the power levels applied to a tomographic apparatus utilizing dual energy techniques such as been suggested for detecting plastic explosives. See, for example U.S. application Ser. No. 08/671,202, filed Jun. 27, 1996 in the names of Bernard M. Gordon et al., and assigned to the present assignee (Attorney's docket No. ANA-94), herein incorporated by reference and referred to as the "Gordon Application". It will be understood, however, that the system has other and wider applications.

Figure 1:
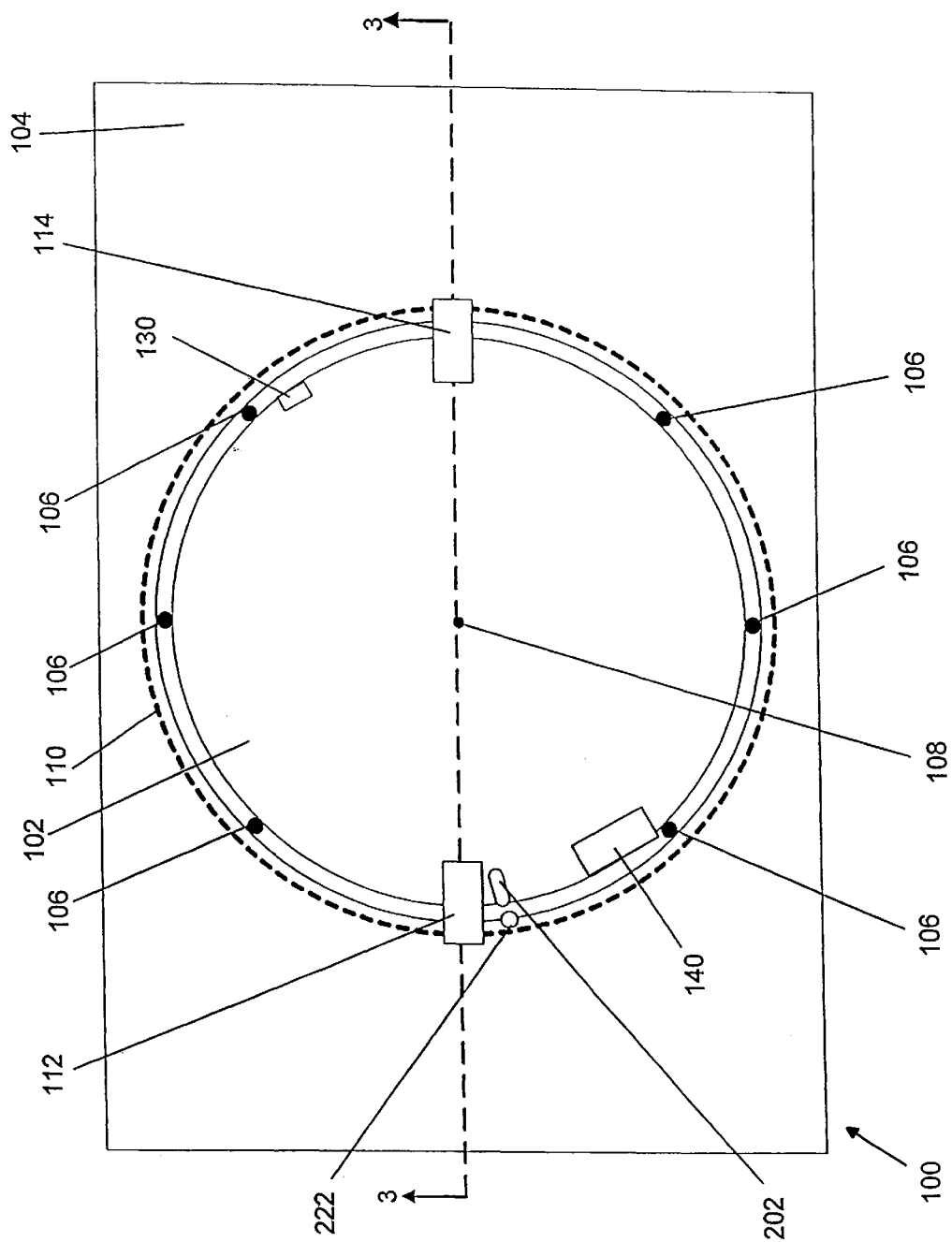
FIG. 1 shows a schematic view of a general CT scan system.

FIG. 1 shows a schematic view of a general CT scan system 100 comprising a rotatable disk 102 mounted to a support 104 via a bearing mechanism 106 so as to allow rotation of the rotatable disk 102 about a rotation axis 108 and within a rotation plane normal to the rotation axis 108. The rotatable disk 102 includes an X-ray source 130 diametrically opposed to a detector array 140. As the rotatable disk 102 rotates about the rotation axis 108, the disk defines a plurality of angular positions with respect to the support 104. A particular angular position of the rotatable disk 102 with respect to the support 104 is referred to as the Home position. The Home position may be selected as a function of system parameters, such as orientation of components on the rotatable disk 102. The present invention determines the position of the rotatable disk 102 with respect to the Home position (hereinafter also referred to as "relative disk position") and performs system control functions (such as triggers for data acquisition and power supply voltage modulation) as a function of the relative disk position. In other forms of the invention, the system may be controlled as a function of angular position of the disk, the angular speed of the disk or the angular acceleration of the device, or combinations thereof.

In general, the invention determines the relative disk position by using one or more sensing elements which are fixed relative to the rotatable disk 102 to sense a plurality of position markers which are fixed relative to the support 104.

In one embodiment of the invention, a primary sensor 112 is attached to the rotatable disk 102 on or near the disk periphery, and a secondary sensor 114 is also attached to the rotatable disk 102 on or near the disk periphery at a location which is substantially diametrically opposite to the primary sensor 112. Both the primary sensor 112 and the secondary sensor 114 are positioned on the rotatable disk 102 so as to be in close proximity to the position markers 110 so that the sensors will sense the markers as the disk 102 rotates relative to the support 104. An additional sensor/marker pair, distinct from the position markers, is preferably included to indicate which of the position markers 110, when detected by the primary and/or secondary sensor 112 and 114, indicates the Home position of the rotatable disk 102, although those skilled in the art will recognize that other methods of determining the Home position may be used. For example, the position marker corresponding to the Home position of the rotatable disk 102 may possess a unique characteristic distinguishable by the sensing elements. The additional sensor is referred to as the Home sensor, and is shown schematically at 202, and the additional marker is referred to as the Home marker, and is shown schematically at 222. In the illustrated embodiment, the Home sensor 202 is rotatable with the rotating disk and the Home marker 222 is stationary relative to the support 104.

Figure 2:
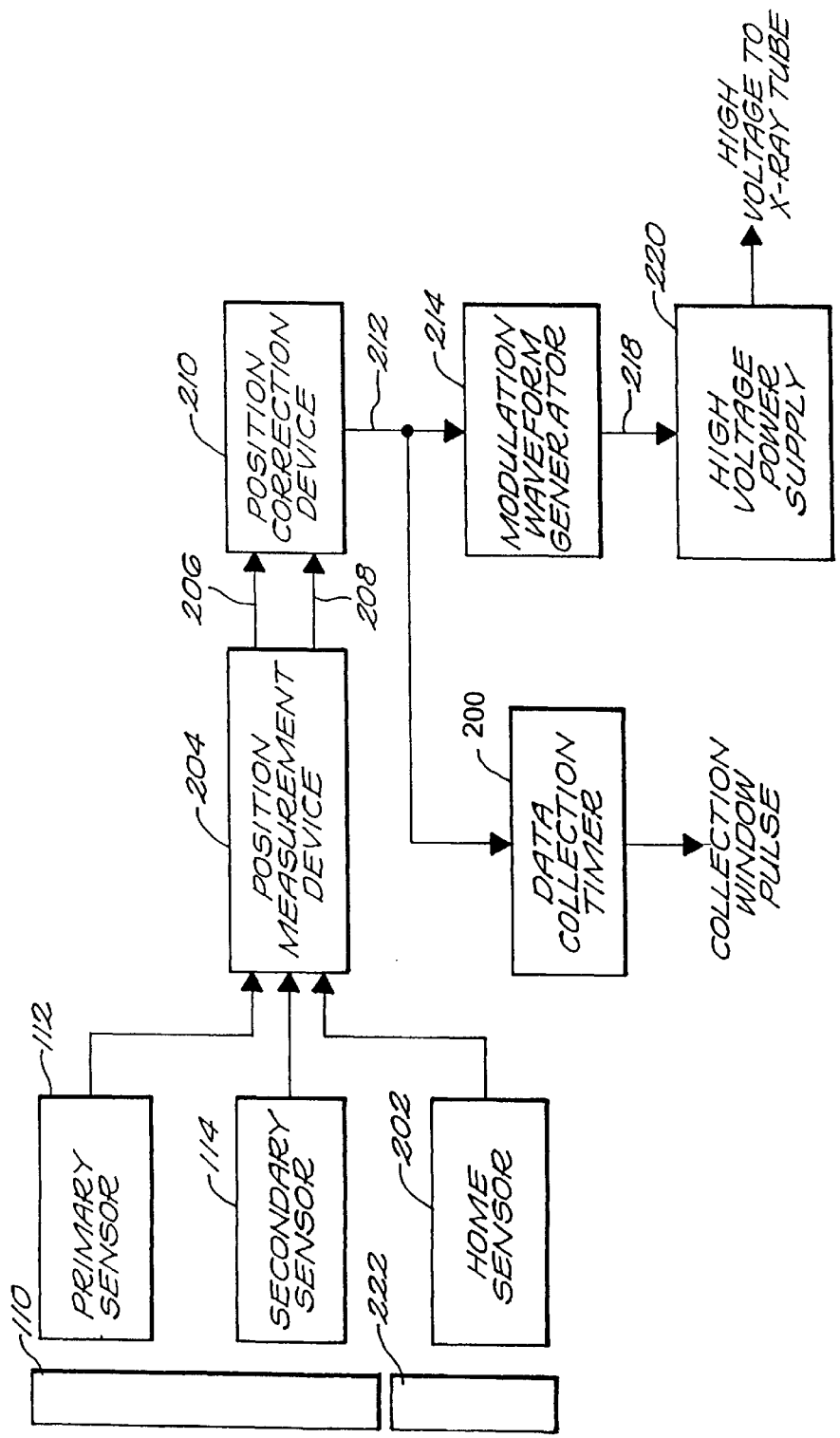
FIG. 2 shows a block diagram one embodiment of a measurement and control system.

FIG. 2 shows a block diagram of the preferred embodiment of a measurement and control system 200 constructed according to the present invention and used to control the modulation of a high voltage power supply of the type described in the Gordon Application. Measurement and control system 200 includes a primary sensor 112, a secondary sensor 114 and a Home sensor 202, all of which detect stationary position markers. The stationary position markers preferably include 360 interval markers 110, designated marker zero through marker 359 (although the number of markers can clearly vary), distributed equiangularly along a circle substantially concentric with the rotation axis 108, and a Home marker 222 which is distinct from the 360 interval markers so as to provide an indication of when the rotatable disk 102 is approaching the Home position. The Home marker 222 is detected only by the Home sensor 202, and the sole function of the Home sensor 202 is to detect the Home marker 222. The Home marker 222 indicates, during rotation of the rotatable disk 102, the approach of marker zero by the primary sensor 112. Consequently, the exact positioning of the Home marker 222 and the Home sensor 202 are not critical, as long as it unambiguously indicates the alignment of marker zero and the primary sensor 112.

The primary sensor 112 and the secondary sensor 114 produce detection signals corresponding to detections of the stationary markers 110, while the Home sensor 202 produces a detection signal corresponding to the detection of the Home marker 222. These detection signals are provided to the position measurement device 204. The position measurement device 204 receives the detection signals and produces a primary data channel 206 and a secondary data channel 208. The primary data channel 206 conveys timing data in response to the primary sensor 112, and the secondary data channel 208 conveys timing data in response to the secondary sensor 114, as is described more completely hereinafter. The position correction device 210 receives the data from the primary data channel 206 and the secondary data channel 208 and combines them to produce a corrected data channel 212. Details regarding the combination of the primary and secondary data channels 206 and 208 are described in greater detail hereinafter.

The modulation waveform generator 214 and the data collection timer 216 both receive data from the corrected data channel 212. The modulation waveform generator 214 uses information from the corrected data channel 212 to determine the correct phase of the modulation waveform output of the generator (which is used to modulate the voltage output of the high voltage power supply 220 to an X-ray tube) with respect to the rotation of the disk 102. The modulating function can be any function synchronized to the detection of the markers, and preferably is selected from the group consisting of PWM sine, PWM [sin(x)+sin(3x)/6], PWM arbitrary waveform and analog arbitrary waveform. The data collection timer 216 uses information from the corrected data channel 212 to produce a collection window pulse which is synchronized to the rotation of the disk 102.

Figure 4:
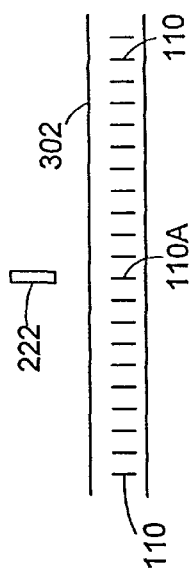
FIG. 4 illustrates a portion of the marker fence shown in FIGS. 1 and 3.
Figure 3:
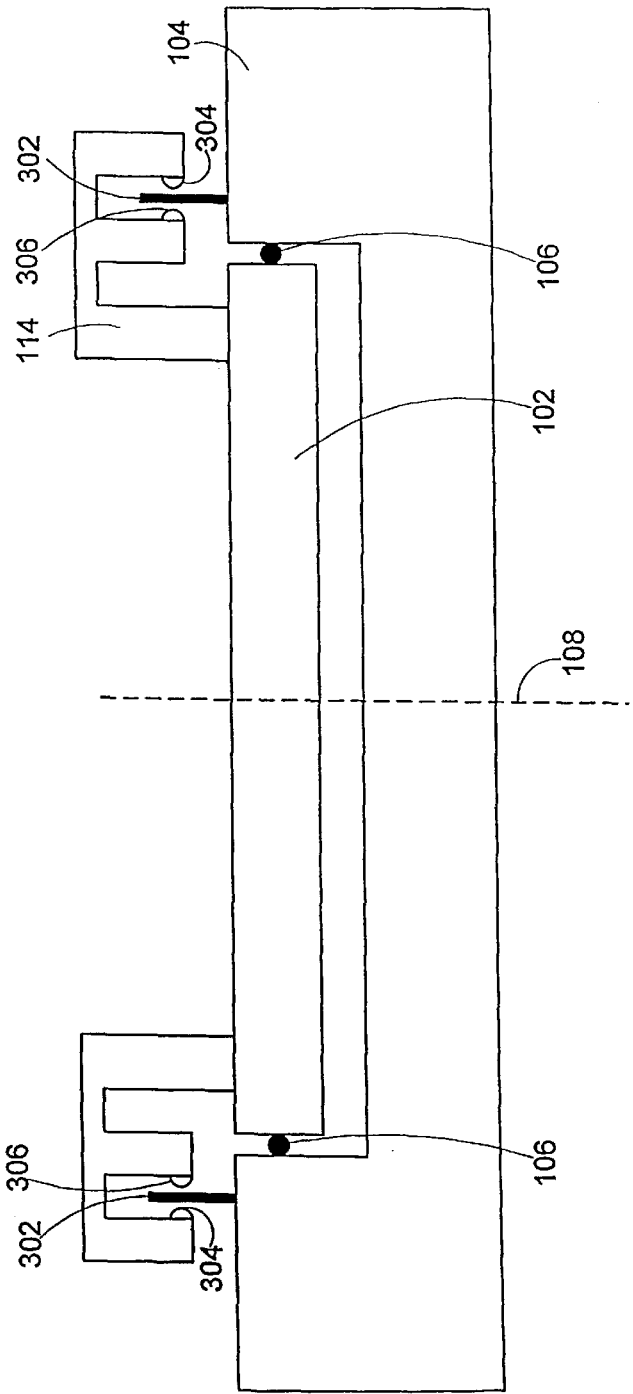
FIG. 3 shows the sectional view along section line 3—3 of FIG. 1.

In the preferred embodiment of the invention, the interval markers 110 are implemented by rectangular apertures in a rigid fence attached to the support 104. FIGS. 1, 3 and 4 illustrate one embodiment of such a fence 302, in which the fence 302 is in the form of a cylinder coaxial with the axis of rotation 108, with one end of the cylinder fixedly attached to the support 104 and the cylindrical wall of the cylinder extending parallel to the axis of rotation 108. Those skilled in the art will realize that other orientations of the fence can be used, for example a disk outside of the periphery of the rotatable disk 102 disposed in the same plane as the rotatable disk 102, or in a plane which is parallel to the plane of rotatable disk 102. In general, each of the primary and secondary sensors includes a transmitter 304 and receiver 306. Each of the primary and secondary sensors detect the apertures by positioning transmitter 304 on one side of the fence 302, and a receiver on the opposite side of the fence 302. As the sensor passes an aperture the radiation from the transmitter passes through the aperture and is detected by the receiver. In between apertures the fence blocks the radiation path from the transmitter to receiver. The primary sensor 112 and the secondary sensor 114 are preferably attached to the rotatable disk 102 at the disk periphery such that the sensors are in close proximity to the fence during the entire 360° rotation of the disk. The fence can also be provided with an aperture representative of the Home marker 222, axially spaced from the interval markers 110, although as described hereinafter, preferably the Home marker is defined simply as the receiver of the sensor 202. FIG. 4 shows a portion of the cylinder containing the aperture flattened to illustrate the positions of the apertures, and the preferred position of the sensor receiver (used as marker 222) of the sensor 202. When the rotatable disk 102 is in the Home position, a radius extending from the geometric center of the rotatable disk 102 passes through the center of the aperture which represents marker zero (hereinafter referred to as the "zero aperture"), and, for example, is shown in FIG. 3 at 110A. This radius is hereinafter referred to as the Home radius. In the preferred embodiment, the primary sensor 112 is attached to the rotatable disk 102 in a position 0.25 degrees prior to the Home radius, and the Home sensor 202 is attached to the rotatable disk 102 in a position 1.05 degrees prior to the Home radius. During normal rotation of the rotatable disk 102 the primary sensor 112 passes the zero aperture 110A prior to the Home radius, and the Home sensor 202 passes the zero aperture prior to the primary sensor 112.

FIG. 3 shows the sectional along section line 3—3 of FIG. 1. In FIG. 3, the primary sensor 112 and the secondary sensor 114 are shown attached to the rotatable disk at the disk periphery such that the primary sensor is diametrically opposed to the secondary sensor. In general, the transmitter 304 of each primary sensor 112 and secondary sensor 114 functions as a transmitter of a reference signal, and the fence 302 functions as an intermittent screen between the transmitter and receiver of the corresponding sensor. The transmitter 304 of each sensor 112 and 114 preferably constantly transmits a signal in the direction of the corresponding receiver of the sensor along a line which is substantially normal to the axis of rotation 108, and as the sensor moves relative to the fence 302, the fence 302 alternately passes and blocks the transmitted signal from the receiver of the sensor. In the preferred embodiment of the invention, the transmitter transmits light to the receiver, for example via a light emitting diode, although those skilled in the art will realize that the transmitter/receiver pair may communicate via other transmission media and in other ways, e.g. by positioning the transmitter and receiver on the same side of the fence, and reflecting light from the transmitter to the receiver when the light hits a marker, or using other portions of the electromagnetic spectrum, such as infrared, ultraviolet, sound or electromagnetic fields. Further, the receiver of the sensor converts the light it receives to an electrical signal, for example via a phototransistor, wherein a low voltage interval signal (relative to a reference voltage) corresponds to a relative disk position characterized by the fence 302 blocking light from the receiver of the sensor, and a high voltage interval signal (relative to a reference voltage) corresponds to a relative disk position characterized by the fence 302 passing light to the receiver of the sensor. The receiver of the sensor thus produces an interval signal which varies with the angular position of the rotatable disk 102.

Figure 5:
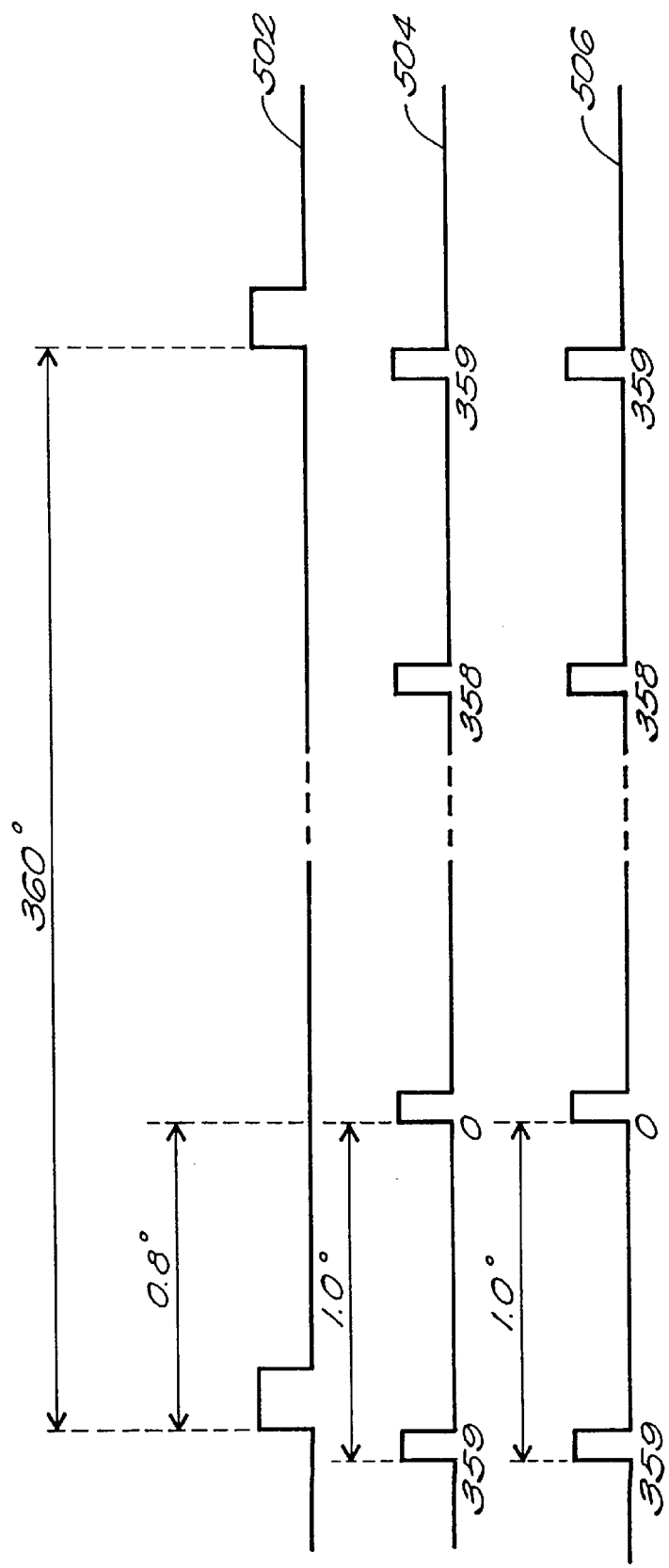
FIG. 5 shows the periodic signals produced by the primary sensor, the secondary sensor and the Home sensor.

The operation of the Home sensor 202 is such that at the Home position of the disk, the sensor provides in suitable indication of that condition. The Home marker 222 is preferably forms either the transmitter or receiver of the sensor, with the marker fixed to the support 104, and the other is attached to the rotatable disk 102. The Home sensor 202 (including marker 222) is oriented so that its maximum sensitivity is provided when the transmitter and receiver are aligned at the home position. Thus, in contrast with the primary and secondary sensors, the Home marker 222 (e.g., the transmitter) is fixed relative to the support 104 and the Home sensor 202 (i.e., the receiver) is fixed relative to the rotatable disk 102. Where the transmitter and receiver, for example, are mounted so that the light path from the transmitter to the receiver (at the Home position) is parallel to the rotation axis 108, both the transmitter and receiver are positioned at a substantially equal radius with respect to the axis of rotation. With this arrangement, as the rotatable disk 102 approaches the Home position, the transmitter and receiver of the Home sensor 202 are located at the same angular and radial positions. The receiver of the Home sensor 202 converts the light that it receives from the transmitter into an electrical signal. The transmitter and receiver of the Home sensor 202 form a highly directional communications pair, so the electrical signal from transmitter produces a strong, detectable signal spike for only a few fractions of a degree of the rotation of disk When the disk 102 rotates with a constant angular speed, the primary sensor 112, secondary sensor 114 and Home sensor 202 produce periodic signals as shown in FIG. 5, which includes the Home sensor pulse train 502, the primary sensor pulse train 504 and the secondary sensor pulse train 506. The amount of time from the rising edge of any pulse in the primary sensor pulse train 504 to the rising edge of an adjacent pulse in the primary sensor pulse train 504 is representative of one degree of rotation of the rotating disk 102. Similarly, the amount of time from the rising edge of any pulse in the secondary sensor pulse train 506 to the rising edge of an adjacent pulse in the secondary sensor pulse train 506 is representative of one degree of rotation of the rotating disk 102. The amount of time from the rising edge of any pulse in the Home pulse train 502 to the rising edge of an adjacent pulse in the Home pulse train 502 is representative of one full 360 degree rotation of the rotating disk 102. Consequently, for each pulse from the Home pulse train 502 there are 360 pulses from the primary pulse train 504 and 360 pulses from the secondary pulse train 506. The pulse in the primary pulse train 504 corresponding to the zero aperture (hereinafter referred to as the primary zero pulse) is the first pulse after the occurrence of a pulse from the Home pulse train 502, and the pulse in the secondary pulse train 506 corresponding to the zero aperture (hereinafter referred to as the secondary zero pulse) is the $181^{st}$ pulse after the occurrence of a pulse from the Home pulse train 502. Because of the relative positioning of the Home sensor 202 and the primary sensor 112 on the rotating disk 102, the amount of time a pulse in the Home pulse train 502 to the next subsequent pulse in the primary sensor pulse train 504 corresponds to approximately 0.8 degrees of rotation of the rotating disk 102.

The invention determines the angular position of the rotating disk by measuring the amount of time from an occurrence of a Home pulse to the occurrence of each of the 360 subsequent interval pulses corresponding to the interval markers 110. The invention determines the rotational period of the rotating disk 102 by measuring the time from a pulse corresponding to the zero aperture to a the next subsequent pulse corresponding to a zero aperture. The time of occurrence of each interval pulse, divided by the rotational period of the rotating disk 102 provides a position value which is equivalent to the angular position of the rotating disk 102, and is independent of the rotational period of the disk 102. If only a single sensor is used to produce interval pulses, then the position value is contaminated by angular speed variations of the rotating disk 102. The invention uses two sensors, a primary sensor 112 and a secondary sensor 114, to mitigate the effects of angular speed variations of the rotating disk 102 by combining the position of each interval marker as determined by the primary sensor 112 and the secondary sensor 114, so as to produce a calibrated angular position for each of the interval markers. The resulting calibrated angular position for each of the interval markers is thus independent of marker positioning errors and angular speed variations. In the preferred embodiment of the invention, the following calibration procedure is used to produce a calibrated position value for each of the interval markers:

1. Stabilize the rotation of the rotating disk 102 at 90 revolutions per minute (hereinafter referred to as RPM).
2. Record the time of occurrence of each of the interval pulses in the primary pulse train 504 with respect to the Home pulse.
3. Record the time of occurrence of each of the interval pulses in the secondary pulse train 506 with respect to the Home pulse.
4. Align the information recorded from the secondary pulse train 506 with the information recorded from the primary pulse train 504 by subtracting the time associated with the 180th pulse in the secondary pulse train 506 from each of the times of occurrence for the pulses in the secondary pulse train 506.
5. Average the time of occurrence values of corresponding interval pulses from the primary and secondary pulse trains to produce a series of calibrated position values.
6. Offset each of the calibrated position values to compensate for the aforementioned 0.25 degree offset of the primary and secondary sensors from the true Home position, so as to produce true position values.

The true position values define each of the 360 integer angular positions of the rotating disk 102 with respect to the Home position as a fraction of the complete rotation time. The invention uses a digital counter to determine the various time periods mentioned in the calibration procedure. In the preferred embodiment, the digital counter is implemented by a general purpose microcomputer, for example a Siemens 80C517. The counter may exist as dedicated counter/timer utility on the microcomputer, or it may be implement as a software or firmware routine executed by the microcomputer. The same counter may be used, in conjunction with the true position values, to determine the angular position of the rotatable disk 102. In general, the digital counter is clocked by a stable, accurate source of known frequency, then the digital counter is reset and allowed to begin counting at the beginning of an event to be measured, then the digital counter is stopped at the end of the event to be measured. The resulting output count of the counter multiplied by the period of the clocking source provides the total time of the event to be measured. FIG. 6 shows a table of exemplary values produced by the aforementioned calibration procedure. In this example, the invention determines the count of one revolution of the disk to be 368,640 cycles of the clocking source. To determine this count, the invention resets the counter, begins the counter upon the receipt of a primary zero pulse, then stops the counter via the next subsequent primary zero pulse. The invention again resets the counter and begins the counter upon receipt of the next subsequent primary zero pulse. The invention records the current count at the output of the counter for every pulse the invention receives from the primary pulse train 504. Similarly, the invention records the current count at the output of the counter for every pulse the invention receives from the secondary pulse train 506. However, since the secondary sensor 114 is diametrically opposite from the primary sensor 112, pulse number 181 from the secondary pulse train 506 corresponds to pulse the first pulse from the primary pulse train 504. The invention aligns the counts from the secondary pulse train 506 to the counts from the primary pulse train 504 by subtracting the count recorded from pulse number 180 of the secondary pulse train 506 from all of the other counts recorded from the secondary pulse train 506. In FIG. 6, when the invention receives the first pulse from the primary pulse train 504 after the home pulse, the counter output is at 1,021. When the invention receives the pulse from the secondary pulse train 506 which corresponds to the first pulse of the primary pulse train 504 (i.e., after alignment), the counter output is at 1,025. The invention averages these two counts to produce an average count of 1,023 corresponding to the first degree marker. Since the primary sensor 112 is offset from the home radius by 0.25 degrees, the invention adds a count corresponding to 0.25 degrees to the average count to produce a true position value. The count corresponding to 0.25 degrees is $$0.25 * \left[\frac{1}{360}\right] * 368,640 = 256$$

Therefore, in this example, the angular position of the rotatable disk 102 which corresponds to one degree past the Home position occurs 1,279 counts of the counter after a pulse from the Home pulse train 502. Similarly, the invention calculates a true position value for each of the 360 angular positions corresponding to the interval markers 110.

In operation, the invention resets and begins the counter upon receipt of a primary zero pulse. For each pulse it receives from the primary sensor 112, the invention uses the corresponding true position value to determine the timer count which corresponds to the true angular position of the rotatable disk 102. Referring to the exemplary data from FIG. 6, when the invention receives the first pulse from the primary sensor 112 following a pulse from the Home pulse train 502, the count at the counter will be approximately 1021 (variations in disk 102 angular speed may cause this count to vary). Since the true count value of the first pulse is 1,279, the invention will trigger the system functions and processes, which need to be performed when the disk 102 is one degree past the Home position, when the counter reaches count 1,279.

Given two adjacent angular positions, the invention calculates the instantaneous angular velocity ω as $$\omega = \frac{\Delta \theta}{\Delta t}$$

where Δθ is the change in angle (in this example one degree), and Δt is the amount of elapsed time from one angular position of the disk 102 to the next. Given an angular position and the instantaneous angular velocity ω, the invention uses linear interpolation to determine angular positions of the disk 102 between those positions indicated by the interval markers 110. For example, using the exemplary data of FIG. 6, when the rotatable disk 102 rotates from 1 degree to 2 degrees, the angular velocity ω is calculated as $$\omega = \frac{1 \text{ degrees}}{2301 - 1279} = \frac{1}{1022} \frac{\text{degrees}}{\text{counts}}$$

where Δt is measured in counts of the counter. Assuming that the angular velocity is constant, the count corresponding to a position between 2 and 3 degrees may be predicted. For example, the disk will be in the 2.5 degree position at a count of $$2301 + \left[\frac{1}{2} * 1022\right] = 2812.$$

The invention triggers data collection from the X-ray detectors at precise angular positions, and it synchronizes the modulation waveform which drives the high voltage power supply for the X-ray source to the angular position of the rotating disk 102. Those skilled in the art will recognize that the invention may be used to trigger other system functions and processes which must be coordinated with the angular position of the rotatable disk 102. The invention may also be used to produce trigger signals for a plurality of system functions, which may or may not be conditioned upon other trigger signals or system functions derived from such signals.

The invention may be embodied in other specific forms without departing from the spirit or essential characteristics thereof. The present embodiments are therefore to be considered in respects as illustrative and not restrictive, the scope of the invention being indicated by the appended claims rather than by the foregoing description, and all changes which come within the meaning and range of the equivalency of the claims are therefore intended to be embraced therein.

What is claimed is:

1. A system comprising:
    a rotatable device;
    a support structure constructed and arranged so as to rotatably support the device for rotation about a rotation axis and so as to define (a) a rotation plane normal to said rotation axis and (b) a geometric center positioned within said rotation plane;
    a measurement and control subsystem constructed and arranged so as control one or more system functions as a function of one or more measurable parameters of said rotatable device, and for providing to said rotatable device at least one signal corresponding to said one or more parameters, said measurement and control subsystem comprising:
    A. N interval markers, N being an integer, fixed relative to said support structure and being distributed so as to be angularly spaced from one another along an arc of known radius of curvature substantially concentric with the geometric center;
    B. a sensing arrangement, fixed relative to said rotatable device, and constructed and arranged so as to sense said markers at at least two different angular sensing positions about said geometric center as said rotatable device rotates about said rotation axis;
    C. a measurement subsystem constructed and arranged so as to measure said one or more parameters as a function of the sensing of said markers at each of said angular sensing positions and a measured time lapse since the last marker was sensed at each of said angular sensing positions; and
    D. a control subsystem constructed and arranged so as to provide to said rotatable device said at least one signal corresponding to said rotational parameters so that at least one of said system functions is controlled as a function of at least one of said rotational parameters.

2. A system according to claim 1, wherein said measurable parameter is selected from the group consisting of angular position of said rotational device, angular speed of said rotational device and angular acceleration of said rotational device.

3. A system according to claim 1, wherein said interval markers include N apertures located in a substantially rigid fence disposed along said arc, said sensing arrangement includes a transmitter and a receiver positioned such that said transmitter directs a transmitted signal to said receiver and said rigid fence separates said transmitter from said receiver, wherein said transmitted signal is alternately passed by said apertures in said fence and blocked by said fence as said rotatable device rotates about said rotation axis.

4. A system according to claim 3, wherein said sensing arrangement includes a first sensor located at a first sensing position, a second sensor located at a second sensing position diametrically opposed to said first sensing position and a third sensor located substantially adjacent to said first sensor so as to provide an independent indication of said first sensing position.

5. A system according to claim 4, wherein said one or more measurable parameters includes angular position, and said measurement subsystem includes a counter which for the $j^{th}$ interval marker, for all j from 1 to N, is constructed and arranged so as to
    A. measure a primary $j^{th}$ time lapse, the latter being defined from when said first sensor senses a reference interval marker to when said first sensor senses said $j^{th}$ interval marker;
    B. measure a secondary $j^{th}$ time lapse, the latter being defined from when said second sensor senses said reference interval marker to when said second sensor senses said $j^{th}$ interval marker;
    C. average said primary $j^{th}$ time lapse and said secondary $j^{th}$ time lapse to produce an average $j^{th}$ time lapse which defines a calibrated interval position so as to mitigate the effects of any angular speed variation of said rotating device.

6. A system according to claim 3, wherein said apertures are substantially rectangular.

7. A system according to claim 3, wherein said transmitter includes a light emitter, and said receiver includes a light detector that generates a sensing signal as a function of at least one characteristic of said transmitted light received by said receiver.

8. A system according to claim 7, wherein said characteristic includes light intensity.

9. A system according to claim 3, wherein said light emitter includes a light emitting diode and said receiver includes a photo transistor.

10. A system according to claim 3, wherein said transmitter is constructed so as to transmit an electromagnetic signal and said said receiver is constructed and arranged so as to generate a sensing signal as a function of a characteristic of the transmitted electromagnetic signal received by he receiver.

11. A system according to claim 3, wherein said transmitter includes a sound emitter, and said receiver includes a detecting for detecting sound and generating a sensing signal as a function of at least one characteristic of the sound received from the emitter.

12. A system according to claim 1, wherein said one or more system functions includes a regulated voltage output, and said control subsystem includes a modulator for modulating said regulated output with a modulating function.

13. A system according to claim 12, wherein said modulating function is selected from the group consisting of PWM sine, PWM, PWM arbitrary waveform and analog arbitrary waveform.

14. A system including a X-ray source constructed to generate an X-ray beam and a plurality of detectors for detecting X-rays during a CT scan, comprising:

a CT scanning disk that supports at least the X-ray source, a support structure constructed and arranged so as to support the scanning disk for rotation about a rotation axis and so as to define (a) a rotation plane normal to said rotation axis and (b) a geometric center positioned within said rotation plane, a measurement and control subsystem constructed and arranged so as to control one or more system functions as a function of measurable parameters of said CT scanning disk, and so as to provide to said CT scanning disk at least one signal corresponding to said measurable parameters, comprising:

A. N interval markers, N being an integer, fixed relative to said support structure and being distributed so as to be angularly spaced from one another along an arc of known radius of curvature substantially concentric with the geometric center;

B. a sensing arrangement, fixed relative to said CT scanning disk, and constructed and arranged so as to sense said markers at at least two different angular sensing positions about said geometric center as said rotatable disk rotates about said rotation axis;

C. a measurement subsystem constructed and arranged so as to measure said one or more parameters as a function of the sensing of said markers at each of said angular sensing positions and a measured time lapse since the last marker was sensed at each of said angular sensing positions; and D. a control subsystem constructed and arranged so as to provide to said scanning disk said at least one signal corresponding to said rotational parameters so that at least one of said system functions is controlled as a function of at least one of said rotational parameters.

* * * * *

UNITED STATES PATENT AND TRADEMARK OFFICE

CERTIFICATE OF CORRECTION

PATENT NO.: 5,932,874

DATED: August 3, 1999

INVENTOR(S): Geoffrey A. Legg, et al.

It is certified that error appears in the above-identified patent and that said Letters Patent is hereby corrected as shown below:

Claim 13, column 13, line 12, after "PWM", second occurrence, insert
-- $[\sin(x)+\sin(3x)/6]$ --.

Signed and Sealed this

First Day of February, 2000

*Attest:*

Q. TODD DICKINSON

*Attesting Officer*  *Acting Commissioner of Patents and Trademarks*